UNITED STATES PATENT OFFICE.

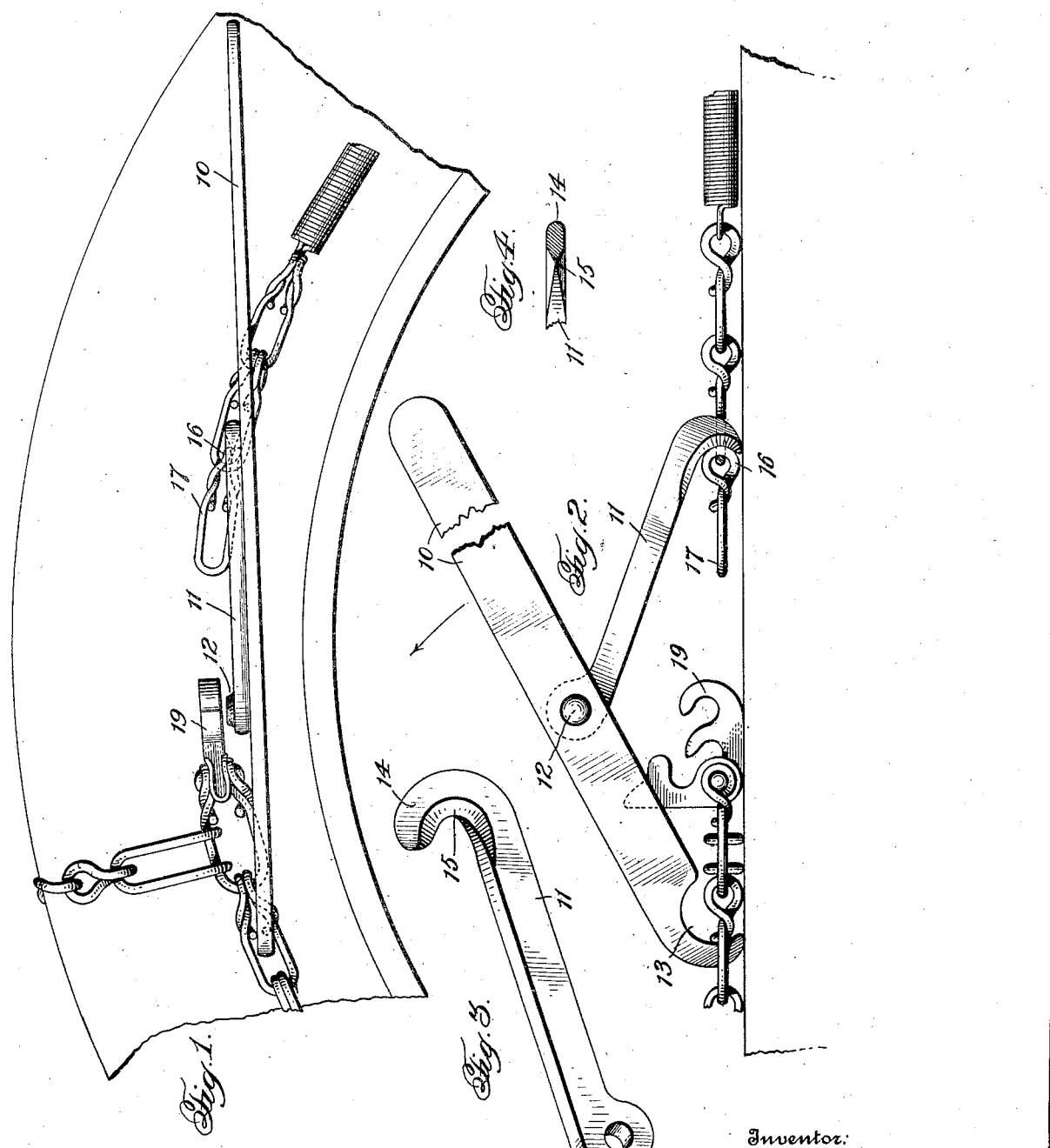

BENJAMIN FRANK GEIGER, OF OSKALOOSA, KANSAS.

TIRE-CHAIN TIGHTENING AND RELEASING TOOL.

1,411,884.  Specification of Letters Patent.  Patented Apr. 4, 1922.

Application filed May 12, 1921. Serial No. 468,939.

*To all whom it may concern:*

Be it known that I, BENJAMIN FRANKLIN GEIGER, a citizen of the United States, residing at Oskaloosa, in the county of Jefferson and State of Kansas, have invented certain new and useful Improvements in Tire-Chain Tightening and Releasing Tools, of which the following is a specification, reference being had therein to the accompanying drawing.

The invention which constitutes the subject matter of this application relates to tools for applying anti-skid chains, commonly known as "Weed-chains", to the tires of motor vehicles, the object of the invention being to provide a tool of this character which is strong, durable and of extreme simplicity, and by means of which these anti-skid chains may be easily and quickly connected and disconnected under the most unusual conditions.

Considerable difficulty has heretofore been experienced in the use of other tools for applying anti-skid chains to the tires of motor vehicles, in that it has been found impossible under all conditions, and while the chain is under tension, to hold the terminal link in proper position where it may be easily attached to the terminal chain hook ordinarily provided upon these chains for connection to said terminal link.

To this end, it is the purpose of the present invention to provide a tool of the character specified having means adapted to engage between the usual eyes of the terminal chain link whereby said link is held in an extended position in line with the direction of pull upon the chain during attachment, thus facilitating the connecting of the ends of said chain.

In the drawings:—

Figure 1 is a side elevation of part of an automobile tire equipped with a chain to be secured thereto, and also showing a tool embodying the invention, in the operation of connecting the ends of said chain;

Figure 2 is a side elevation of the tool itself in the operation of connecting the ends of a chain;

Figure 3 is an enlarged perspective view of the beveled hook member, and

Figure 4 is a detail sectional view of the beveled end of said hook member.

Referring particularly to the accompanying drawing, in which is illustrated the preferred embodiment of this invention, the chain tool comprises in its construction a straight bar or lever 10, and a pivoted hook member 11, connected at one end to the bar or lever by a rivet 12, or other suitable form of pivot.

The bar or lever 10 forms a handle at one end and is provided at its other end with a cutaway portion forming a hook 13 adapted to engage, in the usual manner, the hook end of an anti-skid chain, when applying the same to a vehicle wheel or tire.

The pivoted member 11 is provided at its free end with a curved or hook portion 14, the inner or link engaging edge of which is beveled on opposite sides thereof as clearly shown at 15, thus providing a means for readily engaging between the usual eyes 16—16 of the terminal chain link 17, and positively holding or retaining said link, during the application of the chain to a tire, in an extended position in line with the direction of pull upon the ends of the chain, thus permitting the terminal link to be connected to the chain hook 19, without the usual difficulty.

In using the tool the hook 13 of the bar 10 is connected or applied to one of the chain links at that end of the chain provided with the usual hook member 19, and the beveled hooked end of the member 11 then inserted within a link at the other end of said chain, where its beveled edge 15 will engage between the eyes 16 of the terminal link 17, at this end of said chain. When the tool is in such position the ends of the chain are brought together by exerting an outward pressure upon the handle of the bar or member 10, and as the terminal link is positively held in an extended position in line with the direction of pull upon the ends of said chain during such operation,—as heretofore set forth,—the said terminal link may be easily and readily attached to the hook 19 and the desired connection made.

It is to be noted that by the use of this beveled hook the link eyes are only spread apart slightly and are not injured in any way, the frictional engagement between the beveled edge of said hook and the link eyes being to effectively hold and retain the terminal link in proper position for making the necessary connection. Furthermore, the irregularities in the normal position and form of the link eyes, due to manufacture and continued wear, will not effect the holding of the terminal link in its proper extended position, as the beveled edge exerts its pressure between the link eyes and not upon the extreme rear faces of said eyes.

I claim:—

1. An anti-skid chain tightener and releaser, comprising a lever having at one end link engaging means, and a member carried by said lever and provided with means for engaging between the eyes of a terminal chain link for holding said link in proper position for engagement.

2. An anti-skid chain tightener and releaser, comprising a lever having at one end link engaging means, and a member pivoted to said lever and provided with a link engaging hook having a beveled edge adapted to engage between the eyes of a terminal chain link for holding said link in position for engagement.

3. An anti-skid chain tightener and releaser, comprising a lever having at one end link engaging means, and a member pivoted to said lever and provided with means adapted to engage between the eyes of a terminal chain link for holding and retaining said link in an extended position and substantially in line with the direction of pull upon the ends of the chain being attached.

4. An anti-skid chain tightener and releaser, comprising a lever having at one end link engaging means, and a member pivoted to said lever and provided with a link engaging hook oppositely beveled at its inner or link engaging edge to fit between the eyes of a terminal link for holding and retaining said link in proper position during attachment.

5. An anti-skid chain tightener and releaser, comprising a lever having at one end link engaging means, and a member pivoted to said lever, said member provided with a curved end portion, the inner edge of the curved portion being beveled so as to engage between the eyes of a terminal chain link for holding and retaining said link in position where it may be readily connected.

6. Means for approaching the terminals of anti-skid chains comprising a lever adapted to engage a link at one end of a chain, together with means cooperating with said lever and adapted to engage between the eyes of a link at the opposite end of the chain, to draw the two ends together and present the loop of said second link in position for engagement.

In testimony whereof I affix my signature in the presence of two witnesses.

B. FRANK GEIGER.

Witnesses:
Roy McKay,
Robt. L. Kline.